United States Patent Office 3,000,530
Patented Sept. 19, 1961

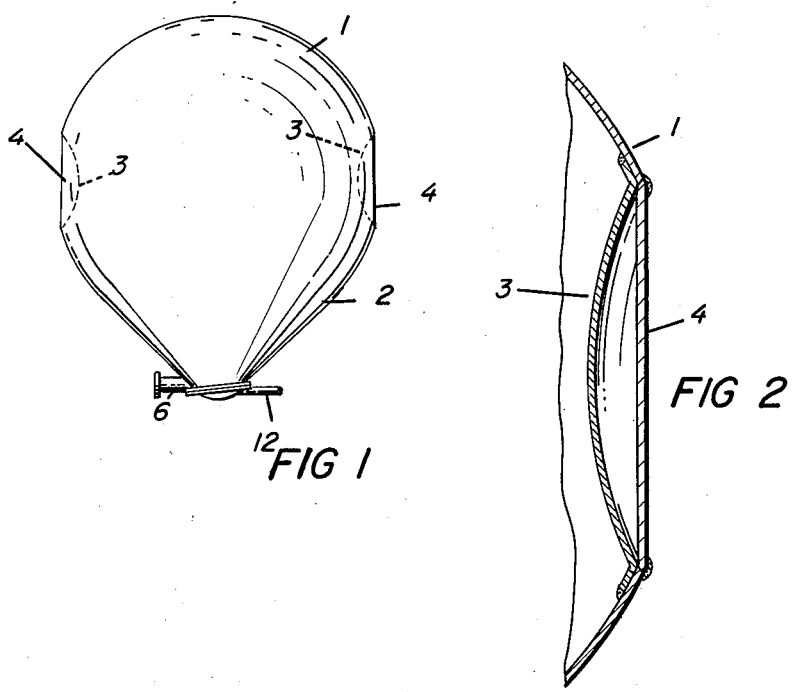
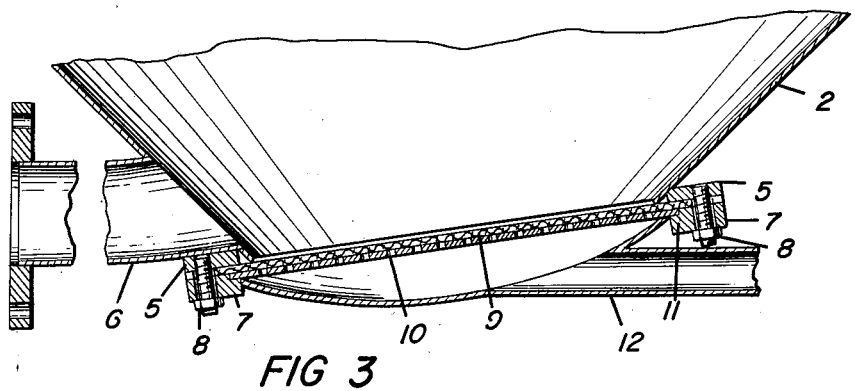

3,000,530
TRANSPORT TANKS HAVING A SUBSTANTIALLY SPHERICAL WALL
Helmuth William Carlsen, Limhamn, Sweden, assignor to AB Interconsult, Malmo, Sweden, a corporation of Sweden
Filed Oct. 23, 1959, Ser. No. 848,239
Claims priority, application Sweden Aug. 8, 1959
2 Claims. (Cl. 220—1)

This invention relates to transport tanks for transporting pulverulent or liquid materials. From several points of view a substantially spherical shape is highly advantageous for such tanks particularly when they are subjected to internal pressure during filling or emptying or when they are constantly under internal pressure in a filled state.

Such tanks naturally must have the highest capacity possible to provide the most economical transport of the materials concerned. However, in all countries there are governmental regulations, drawn up in collaboration with the big transport companies and prescribing that the height and width of a loaded vehicle must not exceed a given maximum, and consequently there is a limit to the size of the transport tanks which are erected on, or built into, such vehicles. The maximum width laid down by said regulations always being smaller than the maximum height, it is the maximum width that will normally be determinative of the maximum diameter of a transport tank having a substantially spherical wall.

The present invention has for its object to permit the capacity of a substantially spherical transport tank to be increased considerably beyond that defined by the maximum width laid down for a loaded vehicle, while maintaining the mechanical and weight-saving advantages resulting from the spherical shape of the tank.

The invention thus relates to a transport tank with a substantially spherical wall and is characterized by the fact that the tank has two inwardly curving spherical cups at two diametrically opposed points of its substantially spherical wall.

By the use of the invention, it will thus be possible to give the substantially spherical wall of the transport tank a considerably larger diameter than the diameter which corresponds to the prescribed maximum width of a loaded vehicle. In the case of a transport tank for pulverulent materials which is provided at its lower end with an outlet for the pulverulent material and a compressed air pipe opening into the tank adjacent said outlet and having the mouth thereof which is in the tank covered by a substantially plane diaphragm which is permeable to air but not to powder, it is sometimes possible, by exploiting the invention, to arrive at a new limit for the diameter of the spherical wall of the tank, said limit being defined by the prescribed maximum height of a loaded vehicle. In the prior art transport tanks for pulverulent material of the kind hereinbefore described the outlet is directed downwardly and connected to the apex of a conical bottom portion of the tank. To permit a further increase of the diameter of the substantially spherical wall of such a transport tank beyond the last-mentioned limit a further development of the invention is directed to the measure that at least adjacent to the tank said outlet and said compressed air pipe are substantially horizontal and approximately aligned and that the diaphragm is inclined downwardly from the compressed air pipe to the outlet at an angle of at most about 15° to the horizontal plane.

Further objects of the invention and the advantages gained thereby will become apparent from the following description, reference being made to the accompanying drawing which illustrates an embodiment of the invention.

FIG. 1 is a side elevational view of a transport tank according to the invention for use in transporting pulverulent material;

FIG. 2 is a sectional view of a portion of the tank wall;

FIG. 3 is a sectional view of a pneumatic discharging device located in the lower portion of the tank.

The transport tank illustrated in the drawing has a wall 1 which for the greater part is spherical but which merges into a frusto-conical bottom portion 2. Two inwardly curving spherical cups 3 are provided at two diametrically opposed points of the substantially spherical wall portion. These spherical cups are formed from sheet metal members whose marginal portion is secured, for example by welding, to the inner side of the wall 1. The mouth or concave side of the cups 3 is covered by a substantially flat disk 4 which closes a hole in the spherical wall 1 located opposite the respective cup 3 and which is secured to said wall 1, for example by welding.

The frusto-conical bottom portion 2 of the container has an opening at its lower end, the edge of which lies in a plane which makes an angle of at most 15° with the horizontal plane and is surrounded by a flanged ring 5 welded to the bottom portion 2. A substantially horizontal outlet 6 extends from the bottom portion 2 immediately above the lowermost portion of the inclined flanged ring 5. A substantially flat diaphragm 9, for example of cloth or metal wire netting is clamped against the flanged ring 5 by means of a second flanged ring 7 and bolts 8. Said diaphragm closes the opening of the bottom portion 2 which is surrounded by said flanged ring 5, and permits air but not powder to pass. The diaphragm 9 is supported by a perforated plate 10 which is placed in a recess 11 in the inner periphery of the ring 7. A compressed air pipe 12 is welded to the flanged ring 7 and at least adjacent the tank said pipe is substantially horizontal and approximately aligned with the outlet 6. When the powder in the transport tank is to be discharged through the outlet 6, compressed air is supplied through the pipe 12 and penetrates through the plate 10 and the diaphragm 9 into the mass of powder, thus blowing the powder out through the outlet in a known manner.

What I claim and desire to secure by Letters Patent is:

1. A transport tank comprising a substantially spherical confining wall having two substantially circular openings at diametrically opposed positions in said wall, and two inwardly curving spherical cups closing said openings and connected to said spherical wall along the border of said openings.

2. A transport tank according to claim 1 further comprising two substantially plane disks each covering the concave side of one of said spherical cups and connected to said spherical wall along the border of respective opening therein.

References Cited in the file of this patent

UNITED STATES PATENTS 2,657,100   Weller _____ Oct. 27, 1953
2,735,725   Galle _____ Feb. 21, 1956